Patented Feb. 11, 1936

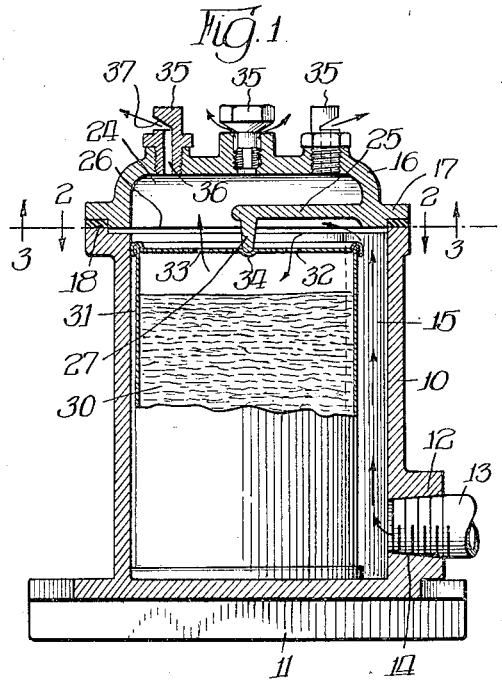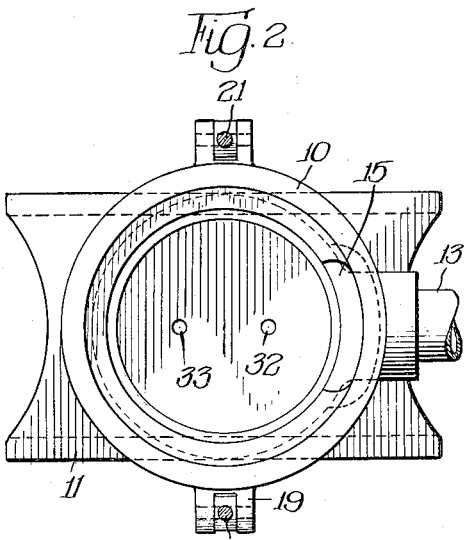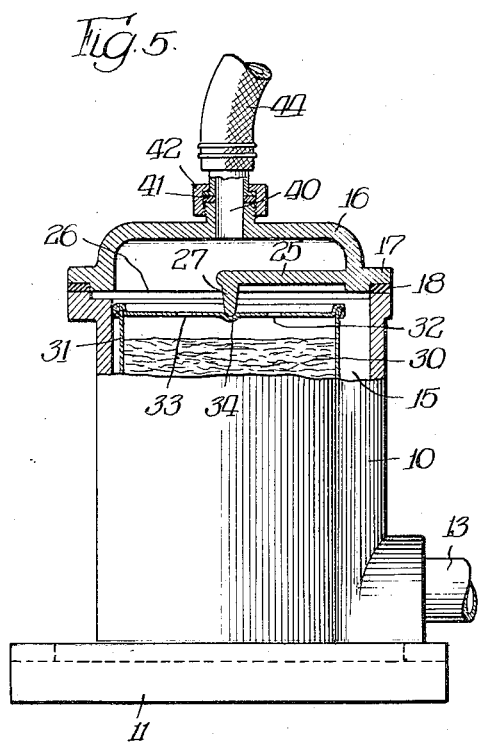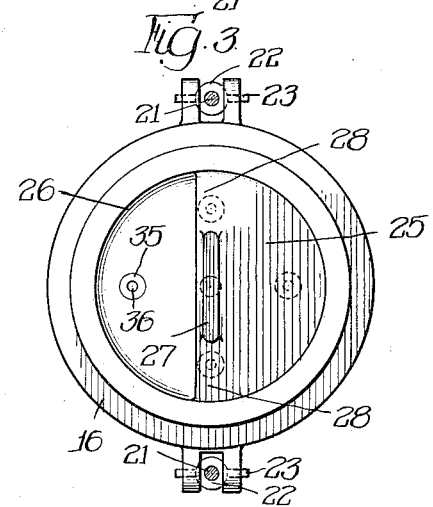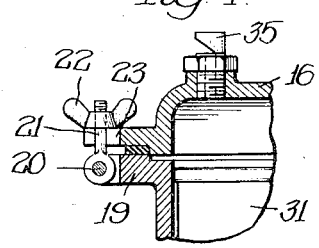

2,030,278

UNITED STATES PATENT OFFICE 2,030,278

FERTILIZER MIXER AND SPRAYER

Ward Thorne, Chicago, Ill.

Application September 9, 1933, Serial No. 688,746

2 Claims. (Cl. 299—84)

This invention relates to a fertilizer proportioning and feeding device suitable for connection to a water line such as a hose, or the like, whereby when the water is passed through the device and subsequently sprayed on a lawn, trees, or other shrubbery, or the soil in which they are growing, a desired quantity of suitable fertilizing material is also deposited with the irrigating water.

It is an object of this invention to provide a fertilizer mixing device which is simple in construction and efficient in operation, and which comprises a sealed chamber adapted to be connected to a water line and equipped with sprinkling outlets or an outlet connection for a hose or similar conduit and which is adapted to contain fertilizing material preferably in a container to be inserted as a cartridge which before insertion, will be provided with one or more inlet and outlet holes through which the water is circulated in the fertilizer mixing operation and which chamber further embodies means for establishing differential pressures within the container whereby to cause the water to circulate through the fertilizing material for dissolving same or becoming admixed therewith.

These and other objects not specifically enumerated are contemplated for this invention as will readily appear to one skilled in the art as the following description proceeds.

The disclosed forms are given merely by way of example and are not to be construed as limiting the invention. The following specification will be more readily understood by referring to the accompanying drawing in which—

Figure 1 is a side elevational view in cross section of one form of the invention;

Figure 2 is a plan view taken on the line 2—2 of Figure 1 and looking in the direction of the arrows;

Figure 3 is a view taken on the line 3—3 of Figure 1 and looking in the direction of the arrows;

Figure 4 is a detailed view showing clamping means for the cover;

Figure 5 is a fragmentary side elevational view of the device of this invention equipped with a modified closure or top which employs a hose or pipe outlet, instead of the sprinkling outlets embodied in Figure 1.

In the drawing, the invention is illustrated as embodied in a fertilizer mixing device comprising a cylindrical chamber 10 of any suitable material, preferably metal, having a stand or base 11, formed rigidly or integrally therewith.

The chamber is equipped with an opening 12, near the bottom thereof to which is connected a water inlet pipe 13 by means of screw threads 14. Adjacent the inlet end of the pipe the interior of the chamber is provided with a vertical passageway 15 disposed externally of the internal circumference of the chamber whereby an unobstructed passage is provided for water to flow upwardly externally of the fertilizer container.

The chamber illustrated in Figure 1 is equipped with a cover 16, provided with a laterally extended flange 17, which is adapted to rest on the upper edge of the chamber with a washer or gasket 18 therebetween for preventing leakage when the cover is clamped tightly thereon.

The cover may be clamped in place by any suitable mechanism but as here illustrated in Figure 4, the chamber is equipped with diametrically opposed lugs 19, at its upper edge, having spaced perforated ears for receiving the hinge pin 20 and clamping bolt 21. The clamping bolts are threaded on their ends for receiving the wing nuts 22 so as to provide locking means for engagement with the diametrically disposed spaced ear projections 23 on the cover. As clearly shown in Figure 4, the bolt is positioned to enter the space between the ears 23 with the wing nuts turned down tightly in locking engagement on top thereof.

The cover is preferably dome shaped to provide an internal cavity 24, a portion of which is covered by the horizontally extending partition 25. The size and shape of this partition is better shown in Figure 3 and it will be noted that it provides an ample space 26 for the free passage of the liquid.

The partition 25 has provided near the edge thereof, a downwardly projecting rib 27, which is of sufficient height to cause its lower edge to abut and tightly press against the upper surface of the fertilizer cartridge or container. The projecting rib 27 is of horizontally less length than the internal diameter of the chamber and cover and therefore water passages 28 are provided around the two ends thereof.

The fertilizer mixture 30 may comprise any material desired, such as may be advantageous for fertilizing lawns, shrubbery, the soil of gardens, and the like, and of such character that it will be either dissolved, mixed, or in any manner picked up by the water as it passes through the device. The fertilizer mixture is preferably supplied in a can or container 31 of suitable construction and material, as shown, so as to be supplied in a sealed condition of correct size to exactly fit the interior of the mixing device and to be inserted therein as a cartridge. Before insertion however, the user must puncture one or more inlet holes 32 and one or more outlet holes 33, as shown in Figures 1 and 2, which are so positioned that the inlet holes will be disposed under the partition 25 and the outlet holes adjacent the water passage 26, with the projecting rib 27 therebetween. The holes may be of any desired number and size and if preferred, may be already provided in the container and provided with suitable closure members, such as corks, plugs and the like. As shown in Figure 1, the projecting rib is intended to engage and tightly press against the upper surface of the fertilizer container as at 34, so as to form an effective baffle or barrier for the water part way across the top of the chamber.

The top surface of the cover 16, as illustrated, in Figure 1, may be equipped with one or more (in this case four) spray nozzles 35, which are mounted by screw threads in openings in the top. The form here illustrated, includes an outlet duct 36 and a spray baffling surface 37 disposed to direct liquid and mixed fertilizer in various directions, as a spray.

It will be understood that this device is adapted to be placed on a lawn, in a garden, or amongst shrubbery and connected to a water line whereby the water in passing to the spray nozzles will become admixed with or dissolve a prescribed quantity of fertilizer which will be conveyed with the sprayed water to the vegetation and soil on which the water falls.

One feature of this invention resides in the establishment of a differential internal pressure as effected by the rib 27 whereby a portion of water passing through the device is caused to enter the fertilizer container and form a solution or mixture therewith, and to subsequently pass therefrom and be sprayed with the main body of the water. As only a small amount of fertilizer is desired as compared to the volume of water, only a portion of the water passing through the device is caused to enter the fertilizer container. The quantity of fertilizer taken up by the water can be varied by altering the number of size of inlet and outlet holes and by altering the size of the rib 27, with respect to the water pressure employed.

In the form of invention illustrated in Figure 5, the construction for the most part is substantially the same as in Figure 1 and similarly constructed parts are referred to by the same reference numerals. However, the cover 16 is provided with an outlet connection 40, instead of sprinkling jets, which, by means of the packing 41 and gland 42 provides a water-tight connection for a hose 44 or other suitable fluid conduit. It is obvious that this device is adapted to be inserted in a line where the water is conveyed beyond through the hose or pipe to a sprinkler, nozzle or spraying device of any suitable type.

Furthermore, instead of a fertilizer, various insecticides, chemicals, or similar substances may be placed in the chamber and be sprayed with water, on a lawn, trees, or shrubbery, for protection against bugs, insects or other organisms which feed on and attack plant life.

Various other forms which embody the principle of this invention will readily occur to those skilled in the art and the invention is not to be restricted except by the appended claims which are to be construed as broadly as possible in the light of the prior art.

I claim:

1. A fertilizer mixing and dispensing device, comprising in combination, a casing having a can receiving chamber, a can for fertilizer in said chamber provided with inlet and outlet openings respectively on the top thereof, said can having a cross sectional size and shape to substantially fill said chamber but of less height than said chamber whereby to provide at the top thereof a space constituting a transverse fluid passage, a fluid inlet at the bottom of said chamber and an upwardly extending fluid passage connecting said fluid inlet and said transverse fluid passage, a closure for the top of said casing having sealing engagement with the upper edge thereof and having on its under surface baffle means contacting the top of said can between said inlet and outlet openings thereof, and partially interrupting the flow of fluid through said transverse passage, said baffle means causing a portion of the fluid in said transverse passage to pass downwardly through said inlet openings of said can and thence upwardly through said outlet openings of said can, and then permitting the fluid from said outlet openings to rejoin the fluid flow in said transverse passage, said closure further having outlet means in communication with said transverse passage at locations adjacent said outlet openings of said can.

2. A fertilizer mixing device comprising a casing having bottom and side walls defining a central can receiving chamber, an upwardly extending fluid passage formed in the wall of said casing, externally of said chamber, and an inlet opening in said casing at the bottom thereof communicating with said passage, a closure for the top of said casing having sealing engagement therewith, formed to provide a chamber above said can receiving chamber, a horizontal partition extending partly across said chamber carried by said closure adjacent the upper end of said upwardly extending passage and defining a transverse passage communicating with said upwardly extending passage, a downwardly extending baffle on said partition partially interrupting said transverse passage, and outlet means in the top of said closure communicating with the chamber above said can receiving chamber formed by said closure.

WARD THORNE.